3,338,986
CONTINUOUS BLOCK COPOLYMERIZATION
PROCESS
Irving Leibson, Odessa, Tex., and Donald H. Getz, Montvale, N.J., assignors to Rexall Drug and Chemical Company, Los Angeles, Calif., a corporation of Delaware
Filed Apr. 23, 1964, Ser. No. 362,075
7 Claims. (Cl. 260—878)

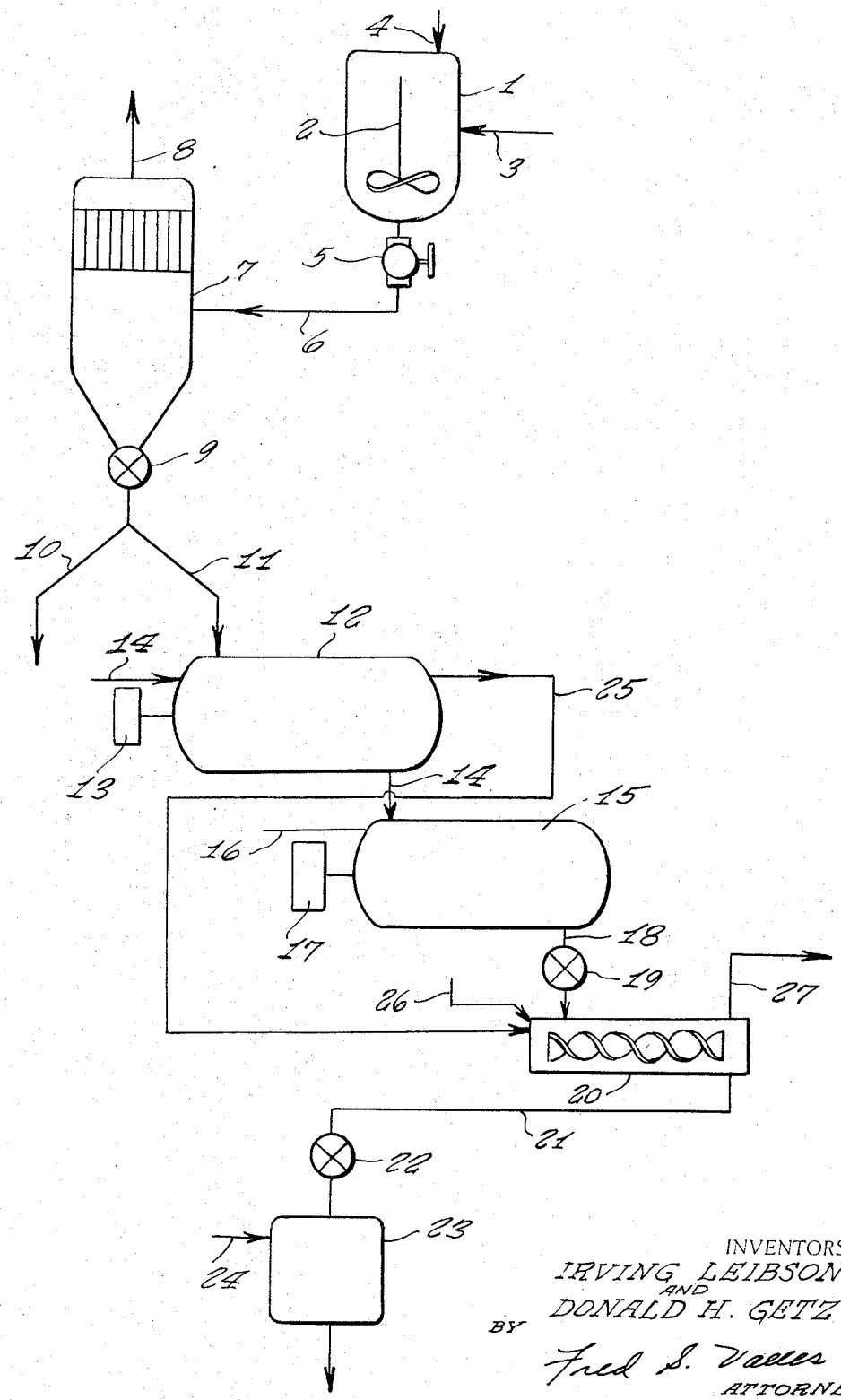
INVENTORS
IRVING LEIBSON
AND
DONALD H. GETZ
BY
Fred S. Valler
ATTORNEY

United States Patent Office 3,338,986
Patented Aug. 29, 1967

This invention is directed to a block copolymerization technique for alpha-olefin polymers and is specifically concerned with a continuous process for preparing block copolymers in a vapor phase reaction zone.

Polymers of propylene, specifically those described in Natta Patents 3,112,300 and 3,112,301 of Nov. 26, 1963, are useful for a variety of applications, specifically for fabricated articles requiring tensile strength and various of the other good properties of isotactic polypropylene. Polypropylene per se, however, without some modification to improve low temperature brittleness properties, cannot adequately be used for applications where the fabricated article is exposed to low ambient temperatures. Various processes and techniques have been disclosed in the published literature for improving the low temperature brittleness property of polypropylene. These improvements can be obtained by blending polypropylene with other polymers or interpolymers such as polyethylene or butyl rubber. More recently, techniques wherein the polypropylene polymer is modified by reacting another monomer onto the live end of a pre-formed polypropylene molecule, have been disclosed. By "live" it is understood that a pre-formed polypropylene molecule contains the catalyst constituents used in the main polymerization reaction and these are still effective for further polymerization of other monomers onto the pre-formed polymer. By this technique, it has been possible to prepare polymer structures such as long chains of polypropylene containing attached thereto chains of polyethylene or ethylene-propylene random copolymers. A variety of monomers can be used to form various polymer configurations including ethylenically unsaturated monomers capable of reacting with pre-formed polypropylene and such compositions likewise find many new uses due to the nature of the components therein. The literature has adequately defined block copolymers, but for clearness it is understood that when reference is made to the term "block" it is intended to mean that a polymer chain of a different configuration or involving at least one different monomer or polymer is attached or reacted with one end of a pre-formed live polypropylene molecule. Employing certain standard ASTM tests, polypropylene has thus been modified so that it can withstand shock without brittle failure at temperatures as low as $-20°$ C. Ordinarily, where ethylene is the polymer involved as the block segment, amounts from as little as 5 to as high as 40% can be incorporated in the total polymer. Where random ethylene-propylene copolymers are attached to a polypropylene molecule, equivalent percentages based on the ethylene-propylene, that is, from 5 to 40%, can likewise be incorporated. Other ethylenically unsaturated monomers (or mixtures) copolymerized with pre-formed polypropylene can be incorporated in equivalent or lesser amounts.

Although information has been published with respect to copolymerization techniques for modifying polypropylene as hereinabove indicated, very little information is available concerning actual processing conditions, specifically those involving large scale block copolymer preparation. For example, although indications are found in publications wherein the reactions are described as being carried out in a continuous process, little, if any, information is revealed as to the operational mechanisms of such reactions. Where polymerization and copolymerization reactions are carried out continuously, certain problems have heretofore been encountered which make such operations difficult and costly.

In a recent process for copolymerizing polypropylene in a vapor phase reaction, involving at least one vapor phase reactor in conjunction with a polymerization vessel and deashing facility, it was found that due to the volatile nature of commercially useful deashing agents, that copolymerization reaction facilities, specifically the vapor phase reaction vessel, became contaminated through back-flow with vapors from deashing agents such as alcohols, thereby affecting the copolymerization reaction, as well as making it difficult to carry out a truly continuous reaction. Thus, efficient deashing agents such as alcohols (or aqueous acids or admixtures) containing from 1 to 8 carbon atoms such as ethanol, isopropanol and up to octanol or polyhydroxy alcohols or oxygenated organic compounds useful for this purpose, either are volatile per se under ambient conditions of temperature and pressure or are rendered volatile in the process operation. For example, in deashing operations involving isopropanol or this alcohol combined with water, mineral acids or hydrocarbons, and in the deactivation and solubilization step wherein the polymer is treated for various lengths of time, it is not uncommon to employ temperatures above 100° F. and usually up to 180° or 200° F. At these high deashing temperatures, the vapor pressure of the lower molecular weight alcohols is considerable and these vapors can back-flow to upstream processing units thereby contaminating those operations adversely. Oxygenated compounds such as alcohols are considered "contaminating" if they exceed 5 parts per million of the polymerizable monomers in the vapor phase reaction of this invention. This is highly undesirable, specifically when an operation such as a block copolymerization is being carried out immediately upstream of the deashing treatment. In cases where this back-flow is serious, the reaction can be terminated by the alcohol vapors. Even small quantities of vapors as indicated, that is, above about 5 p.p.m., backtracking to the polymerization vessel are harmful in that control of the reaction is difficult and in certain instances the block copolymers formed are of low molecular weight, etc., and can cause coalescence of an otherwise flowable polymer powder typical of vapor phase reactions. This invention therefore has as an object the elimination of back-flow of volatile components which can poison a polymerization reaction as above described.

A further and general object of this invention is to provide a process for preparing alpha-olefin block copolymers wherein said reaction is carried out continuously.

A still further object of this invention is to provide a process for polymerizing propylene and carrying out a vapor phase block copolymerization reaction continuously as will be illustrated hereinafter.

The foregoing objects are accomplished in accordance with this invention by providing an improvement in a method for preparing block copolymers of an alpha-olefin polymer wherein a pre-formed alpha-olefin polymer containing active catalyst residues therein is contacted with an alpha-olefin monomer in a vapor phase polymerization zone and wherein after such contact, the resulting block copolymer is treated in a subsequent treatment zone with a volatile deashing agent, the improvement which comprises continuously recovering the block copolymer from the vapor phase reaction zone, continuously introducing said block copolymer to one end of a confined zone and advancing said polymer to the other end thereof and to a discharge outlet leading to a deashing zone, while continously introducing a sweep gas to one end of said confined zone and flowing it concurrently with the movement of the polymer to the other end of the confined zone.

By the terms "volatile deashing agent or volatile component" is intended to mean any deashing agent known in the art such as air, oxygen, water, alcohol or oxygenated (as set forth above) component which tend to normally vaporize (or are vaporizable under the conditions of treatment employed), or are in vapor form and which are effective for inactivating catalyst residues in a live polymer. By the term "gaseous element, sweep gas or seal gas" as used herein is meant a vapor or gas which is not harmful to the polymer or the polymer properties desired, for example, an inert gas such as nitrogen or argon or an active monomer such as propylene, ethylene or even mixtures provided these are the monomer or monomers being employed in the block copolymerization reaction.

Reference is made herein to the attached drawings which illustrates a preferred embodiment of this invention and which shows the flow of polymer from its formation in a polymerization vessel to its separation from a slurry in a bag-filter-cyclone combination, block copolymerization in a vapor phase zone and introduction to a deashing section.

In order that the invention may be fully understood, a brief description of the process as illustrated in the mentioned drawing is presented herewith.

The drawing illustrates a reactor 1 equipped with stirrer 2, propylene inlet means 3 and catalyst feeding means 4. In a continuous reaction involving polymerization of propylene, catalyst and propylene are continuously introduced to the reactor and a slurry of the formed polymer is taken through cyclic let-down valve 5 to line 6 and to cyclone-bag filter combination 7. As will be described in more detail hereinbelow, due to the nature of the reaction ingredients, a flashing or separation occurs in cyclone-bag filter combination 7 wherein unreacted monomer and/or other volatile constituents are taken through line 8 to other processing areas and a polymer powder containing less than 5% volatiles is recovered from the cyclone-bag filter through rotary valve 9 and taken directly to either a deashing treatment, as illustrated, through line 10 or to a block copolymerization facility through line 11 as indicated.

The block copolymerization facility which ordinarily includes one or more vapor phase reactors includes in the preferred embodiment herein two vessels in series (these can be any suitable vessels such as rotary kilns or vessels containing agitation means and preferably jacketed for circulation of heat transfer media), the initial polymerization vessel 12 containing a power driving means 13 to agitate (ribbons or paddles not shown) the polymer powder introduced through line 11. Ethylene and/or a combination of propylene-ethylene (or an ethylenically unsaturated monomer) can be introduced through line 14 to contact the live polymer in vapor phase fashion as indicated in the drawing. In this vapor phase reactor 12, half of the amount, more or less, of the total amount of block copolymer desired can be polymerized and the polymer taken to the second reactor in series 15 through line 14. Additional ethylene or propylene-ethylene mixture can be introduced to reactor 15 through line 16, agitation being provided by power driving means 17. Block copolymer containing the desired amount of ethylene and/or ethylene-propylene in the total polymer is withdrawn via line 18 through rotary valve 19 and introduced to a confined zone 20 which, as generally illustrated in the drawing, is a screw conveyor. The polymer powder is conveyed to the opposite end or outlet end of the confined zone 20 through line 21, rotary valve 22 and deashing vessel 23. Line 24 illustrates a feeding means for vessel 23 to introduce alcohol or other deashing agent to the vessel. The fully treated polymer is recovered from the deashing vessel and processed elsewhere.

A feature of this invention resides in a provision for sealing and preventing any alcohol vapors from back-flowing to the reactors 15 and 12. Ordinarily, under deashing temperatures of 100° F. and above or even at ambient temperatures, the vapor pressure of an alcohol such as isopropanol, for example, is sufficiently strong to permeate and travel back through a rotary valve such as 22 to thereby contaminate a vapor phase reaction being carried out as illustrated. To insure that this contamination does not occur, and to thereby provide for a truly continuous block copolymerization reaction, the process of this invention includes the provision wherein a sweep gas is introduced to one end of the confined zone, specifically the end nearest where the block copolymer is introduced and flowing this gaseous element concurrently in direction of the flow of the polymer. This can be accomplished in one embodiment of this invention by using vent gases from vapor phase reactor 12, such vent gases being taken via line 25 or even from the second reactor or independently through line 26 as illustrated. The gaseous element is then vented from the confined zone through line 27 as indicated in the drawing. It is preferred, according to this invention, to use propylene or a vent gas from one of the reactors to perform this sealing function, the use of such vent gases being an advantage to the process herein. The vent gases can comprise any monomer used in the block polymerization reaction so long as such monomer (or monomers) is also that employed in the vessel 15. By this technique, a truly continuous vapor phase reaction can be provided free from contamination by volatile impurities from subsequent treatment zones as indicated.

The pressure of the sweep gas in confined zone 21 must obviously be sufficient to overcome the vapor pressure of any volatile alcohols attempting to diffuse or back-flow to vessel 15. This sweep gas pressure can readily be determined by knowledge of the composition of the deashing agent and the temperature used for this operation. Generally, however, the sweep gas can be introduced to the confined zone at pressures of from 18 to 24 p.s.i.g. Where the sweep gas is that from reactor 12, then either the pressure in that reactor is the pressure of the sweep gas or the gas can be pressurized further or diminished in pressure if the pressure is already high, all on conformity with the goal of using a pressure in unit 20 sufficient to overcome the vapor pressure of any back-flowing volatile components.

Although reference has been made to propylene as the polymerizable monomer, it should be understood that other alpha-olefins can be substituted for propylene, for example, ethylene, butene-1, pentene-1 and 1-olefins containing up to 10 carbon atoms, as well as branched olefins such as 3-methyl-butene-1, 4-methylpentene-1, 4- and 5-methyl-heptene-1, and the like. It is preferred in carrying out this process that the monomer per se be used as its own diluent in liquid form (bulk reaction) although other normally volatile gases such as propane or butane can be used as diluents under appropriate pressure to cause their liquefaction. Where propylene is used as its own monomer and diluent, then conversions in the reaction are desirably limited to from 10 to 60%, preferably 15 to 40%, in order to provide for easy agitation of the polymer and removal from its reaction zone. Due to the nature of the reaction, that is, carrying it out in liquid phase and under pressure, it is preferred that minimum pressures of 150 p.s.i. be employed in the reaction zone. Pressures up to 1,000 p.s.i. or higher can be used if desired.

After the required conversion, the slurry formed is taken through let-down valve 5 as indicated in the drawings, thereby forming a gaseous and solid phase in line 6 which is introduced to the cyclone-bag filter combination. Since the diluents and/or the monomers used as diluents in the polymerization reaction herein are highly volatile, it is understood that complete or substantially complete separation occurs in the cyclone-bag filter due to the flashing of the volatile constituents. The cyclone-bag filter is maintained at a pressure of from 0 to 50 p.s.i.g. preferably 0 to 25.

Suitable catalysts for use herein in the initial polymerization of propylene are titanium trichloride with an aluminum alkyl compound. In general, however, Natta-Ziegler catalysts as described in Belgian Patents 533,362, 534,792, 538,782 and 543,259 can be employed in the process.

The vapor phase block copolymerization reaction can suitably be carried out by employing reaction temperatures of from room temperature up to 200° F., but preferably from, for example, 130° to 175° F., and pressures of from 0 to 100 p.s.i.g. Since the polymer powder from cyclone-bag filter 7 contains less than 5% volatiles, this powder can be readily agitated in vessels 12 and 15 and polymer blocks added in amounts based on the total polymer of from 5% by weight or less, that is about 1%, to as high as 40% by weight. It is understood that the amount of block copolymer incorporated will depend on the monomer(s) used and the particular physical or chemical property of the ultimate polymer which such addition is intended to improve.

In order that this invention may be more readily understood, the following example is offered.

In this example, it is desired to add 20 percent by weight (based on the total polymer) of ethylene polymer as a block to pre-formed polypropylene of about 90 to 95 percent isotactic content obtained by polymerization in vessel 1 in bulk and employing a titanium trichloride catalyst activated with an aluminum alkyl compound. The polymer slurry from vessel 1 is separated in unit 7 by a simple flashing operation and there is obtained a polymer powder containing less than 5% volatiles which is continuously dropped into vapor phase reactor 12. The conditions in reactor 12 are maintained at a temperature range of from 130° to 175° F. and a pressure range from 10 to 50 p.s.i.g. Sufficient ethylene is pressured in through line 14 to incorporate about 50% by weight of the total amount of ethylene polymer, the other 50% being incorporated in the second vapor phase reactor 15. Unreacted ethylene from reactor 12 is vented from line 25 and taken directly as a sweep gas to unit 20. The pressure of the sweep gas is adjusted to from 18 to 24 p.s.i.g. and it can be adjusted in any way desired through means (not shown) so that the sweep gas which in this case is ethylene will prevent back-flow of alcohol vapors from deashing vessel 23 to reactor 15. The deashing agent in this case is a mixture of isopropanol and heptane which is maintained in vessel 23 at a temperature of from about 100° to as high as 200° F. By operating according to this scheme, the block copolymerization reaction can be carried out continuously and efficiently since absence of poisonous volatile components in reactors 12 and 15 enables maintenance of strict polymerization conditions to obtain a quality product suitable for the specific use for which it was manufactured.

Modifications which can be made to the process herein and which fall within the scope of this invention, include the provision, for example, of a screw feeder and sweep gas combination unit between two or more block co-polymerization reactors so that if different monomers are used in each reactor to form copolymer blocks such reactions can be carried out without the problem of contamination by back-flow of any copolymerization reactant. Thus, while some small mixture of different monomers (for example, 100 parts per million or less) may be permissible in a vapor phase reaction, the process of this invention eliminates any back-flowing of contaminating quantities of monomer(s) where different monomers are used in each reactor to form copolymer blocks. Thus, one vapor phase reactor can be used to form an ethylene polymer block onto polypropylene followed by the formation in a subsequent reactor of a random ethylene-propylene (or propylene alone) polymer block in which case a screw-feeder and sweep gas combination unit could be placed between the two vapor phase reactors to prevent back-flow and contamination of the first reactor with propylene vapors or any other monomer vapor employed in the second reactor different from the first.

Resort can be had to further modifications of the process herein without departing from the spirit of the invention or scope of the appended claims.

What is claimed is:

1. In a process for preparing block copolymers of an alpha-olefin polymer wherein a pre-formed alpha-olefin polymer containing active catalyst residues therein is contacted with an ethylenically unsaturated monomer in a vapor phase reaction zone and wherein after such contact the resulting block copolymer is treated in a subsequent treatment zone with a volatile deashing agent for inactivating said catalyst residues, the improvement in the block polymerization process which comprises continuously recovering said block copolymer from said vapor phase reaction zone, continuously introducing said block copolymer into one end of a confined zone and advancing said polymer to the other end thereof and to said subsequent treatment zone, continuously introducing a sweep gas into one end of said confined zone and flowing it concurrently with the movement of the polymer to said other end of the confined zone to prevent contamination of said ethylenically unsaturated monomer with said deashing agent.

2. The process of claim 1 wherein polypropylene is the pre-formed alpha-olefin polymer.

3. The process of claim 2 wherein the block copolymer formed onto polypropylene is selected from the group consisting of an ethylene polymer and an ethylene-propylene random copolymer.

4. The process of claim 3 wherein the sweep gas is ethylene.

5. A process for preparing block copolymers of polypropylene wherein a pre-formed polypropylene containing active catalysts residues is contacted with an alpha-olefin monomer in a vapor phase polymerization zone and wherein subsequent to such contact the resulting block copolymer is treated with a volatile deashing agent in a deashing operation, the improvement in the continuous block copolymerization process which comprises continuously introducing said pre-formed polypropylene polymer to at least one vapor phase reaction zone, continuously introducing said alpha-olefin monomer to contact with said polypropylene polymer in said reaction zone, continuously removing the resulting block copolymer from said vapor phase reaction zone and introducing it into one end of a confined zone and advancing it to the other end thereof and to an outlet for said block copolymer, continuously introducing a sweep gas into one end of said confined zone and flowing concurrently with the block copolymer movement, said sweep gas being introduced at a pressure sufficient to overcome the pressure from any back-flowing volatile deashing components in said deashing operation to prevent contamination of said alpha-olefin monomer with said deashing components.

6. The process of claim 5 wherein the sweep gas comprises the alpha-olefin monomer used in the vapor phase polymerization zone.

7. The process of claim 6 wherein said sweep gas comprises ethylene.

References Cited

UNITED STATES PATENTS 2,956,994  10/1960  Peterlein _____ 260—94.9

FOREIGN PATENTS 132,546  1/1949  Australia.
829,252  6/1960  France.

MURRAY TILLMAN, *Primary Examiner.*

D. J. BREZNER, *Assistant Examiner.*